United States Patent
Duan et al.

(10) Patent No.: US 7,724,462 B2
(45) Date of Patent: May 25, 2010

(54) SYSTEM, METHOD AND APPARATUS FOR DIRECT HEAD-DISK CLEARANCE MEASUREMENT BY SLIDER VIBRATION AND FLY HEIGHT CALIBRATION

(75) Inventors: Shanlin Duan, Fremont, CA (US); Jizhong He, San Jose, CA (US); John Stephen Hopkins, Gilroy, CA (US); Yansheng Luo, Fremont, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 12/184,300

(22) Filed: Aug. 1, 2008

(65) Prior Publication Data

US 2010/0027152 A1     Feb. 4, 2010

(51) Int. Cl.
G11B 21/02 (2006.01)
G11B 27/36 (2006.01)

(52) U.S. Cl. .......................................... 360/75; 360/31

(58) Field of Classification Search .................. None
See application file for complete search history.

(56) References Cited

U.S. PATENT DOCUMENTS

| | | | |
|---|---|---|---|
| 4,777,544 A | 10/1988 | Brown et al. | |
| 5,130,866 A | 7/1992 | Klaassen et al. | |
| 5,410,439 A * | 4/1995 | Egbert et al. | 360/75 |
| 5,806,978 A | 9/1998 | Abraham et al. | |
| 6,288,856 B1 | 9/2001 | Ottesen et al. | |
| 7,119,979 B2 | 10/2006 | Fong et al. | |
| 7,206,077 B2 | 4/2007 | Nozu et al. | |
| 7,277,252 B1 | 10/2007 | Albrecht et al. | |
| 7,286,314 B2 | 10/2007 | Baumgart et al. | |
| 7,349,170 B1 | 3/2008 | Rudman et al. | |
| 7,365,931 B2 * | 4/2008 | Ikai et al. | 360/75 |
| 2007/0253092 A1 | 11/2007 | Ikai et al. | |

FOREIGN PATENT DOCUMENTS

| | | |
|---|---|---|
| JP | 6103541 | 4/1994 |
| JP | 7208941 | 8/1995 |
| JP | 8050711 | 2/1996 |
| JP | 11265557 | 9/1999 |
| JP | 2003308670 | 10/2003 |

OTHER PUBLICATIONS

Miu, D.K., et al., Dynamic Response of a Winchester-Type Slider Measured by Laser Doppler Interferometry, IEEE Transactions on Magnetics, vol. Mag-20, No. 5, Sep. 1984, pp. 927-929.

(Continued)

*Primary Examiner*—Andrew L Sniezek

(57) ABSTRACT

A method models and calibrates the fly height of a slider above the disk for disk drives. The calibration scheme uses the Wallace spacing loss equation and laser doppler velocimetry to predict fly height and detect the actual fly height of the slider. The slider is vibrated at selected resonances, such as by capacitive coupling to the disk, and the fly height is gradually reduced. In one version, contact between the slider and disk may be detected using an arm electronics sensor. The amplitude of mean-to-peak, vibration detection is used as an indication of the actual fly height and to calibrate the modeled fly height.

15 Claims, 4 Drawing Sheets

OTHER PUBLICATIONS

Shi, W.K., et al., Use of Readback Signal Modulation to Measure Head/Disk Spacing Variations in Magnetic Disk Files, IEEE Transactions on Magnetics, vol. MAG-23, No. 1, Jan. 1987, pp. 233-240.

Li, Yufeng, et al., Flying Height Measurement Metrology for Ultra-Low Spacing in Rigid Magnetic Recording, IEEE Transactions on Magnetics, vol. 32, No. 1, Jan. 1996, pp. 129-134.

Liew, Y.F., et al., Head-Disk Interaction of Proximity Sliders Studied by the Acoustic Emission Probe, the Dynamic Flying Height Tester, and the Laser Doppler Vibrometer, IEEE Transactions on Magnetics, vol. 33, No. 5, Sep. 1997, pp. 3175-3177.

Zhang, J., et al., Calibration of Sub-10-nm Flying Height Using the Bump Response, IEEE Transactiosn on Magnetics, vol. 39, No. 5, Sep. 2003, pp. 2474-2476.

May, Y.S., et al., Consideration and Compensation for Precision Optical Flying Height Measurement, Technology Letters, vol. 25, No. 1, Jan. 2007, pp. 79-85.

* cited by examiner

SYSTEM, METHOD AND APPARATUS FOR DIRECT HEAD-DISK CLEARANCE MEASUREMENT BY SLIDER VIBRATION AND FLY HEIGHT CALIBRATION

BACKGROUND OF THE INVENTION

1. Technical Field

The present invention relates in general to measuring parameters of sliders and disks used in magnetic storage devices and, in particular, to a system, method and apparatus for measuring head-disk clearance by slider vibration and calibrating the fly height performance of sliders in disk drives.

2. Description of the Related Art

In a magnetic disk recording system, a slider containing magnetic transducers for reading and writing magnetic transitions is urged toward the rotating disk by a suspension. As the disk rotates an air bearing develops under the slider and causes it to fly above the disk. The distance between the slider and the disk surface is the clearance. The disk typically includes a thin film overcoat and a set of thin films which include one or more ferromagnetic layers in which information is recorded. A disk drive can contain multiple disks and multiple sliders.

Lower slider fly heights are required for disk drives with higher areal densities. As a result, it is becoming increasingly difficult to measure the actual fly height of sliders. One technique uses white light interferometry and works adequately for large fly heights, but it loses accuracy for smaller fly heights. In addition, it is very sensitive to the optical constants of the slider overcoat. Another technique uses small solid bumps of known height on the disk and measures the acoustic emissions as the slider passes over or hits the bumps. Since it has proved impractical to make very small bumps, this particular technique loses accuracy for very small fly heights. Although this and other methods are workable for some applications, an improvement in measuring head-disk clearance and calibrating the fly height performance of disk drives would be desirable for high performance drive applications.

SUMMARY OF THE INVENTION

Embodiments of a system, method, and apparatus for measuring head-disk clearance and calibrating the fly height performance of disk drives are disclosed. The Wallace Spacing Loss formula or equation provides a conventional technique for calculating or predicting the fly height of a slider above a disk. However, it is calculated against a known scale and is in need of calibration.

In one embodiment, the head flies above the disk and is excited to vibrate (e.g., in a P2 resonance mode) so that the trailing edge or lowest point of the slider relative to the disk varies in distance with respect to the disk. The vibration may be accomplished by various methods, such as arm electronics or electrostatic actuation, without the slider making contact with the disk. A laser doppler velocimeter (LDV) provides a true displacement measurement of head vibration. The calibration of fly height performance can be achieved by comparing the LDV result with values predicted by the conventional Wallace spacing calculation. To achieve a calibration with a wide fly height range, the head is controlled to fly at various fly heights and may be manipulated with thermal fly height control (TFC).

In another embodiment, the invention provides a direct method for measuring fly height clearance between the head and the disk. Optical fly height testers depend on the basic modeling of certain performance values. Bump calibration with speed sensitive airbearing or TFC protrusion depends on bump characterization and data extrapolation which can introduce considerable error. The Wallace spacing method also is model dependent.

A head flying over a disk is a relatively linear system with certain resonance modes in the frequency range of about 50 kHz to 300 kHz. The modes can be excited and the slider will under go simple sinusoidal motion. In particular, the P2 mode, where the trailing edge of the slider vibrates vertically, may be used to detect the vertical fly height clearance between the head and disk. Again, the amplitude of the vibration may be measured with an LDV. The calibration of the LDV measurement is determined by an internal clock and the speed of light and is very accurate. The slider vibrates freely until it contacts the disk. The contact may be detected in several ways, such as with an arm electronics sensor mounted on the slider, such as applications for glide heads. The amplitude of the vibration, mean to peak, at the head and disk contact is the fly height clearance.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the present invention are attained and can be understood in more detail, a more particular description of the invention briefly summarized above may be had by reference to the embodiments thereof that are illustrated in the appended drawings. However, the drawings illustrate only some embodiments of the invention and therefore are not to be considered limiting of its scope as the invention may admit to other equally effective embodiments.

DETAILED DESCRIPTION OF THE INVENTION

Figure 1:
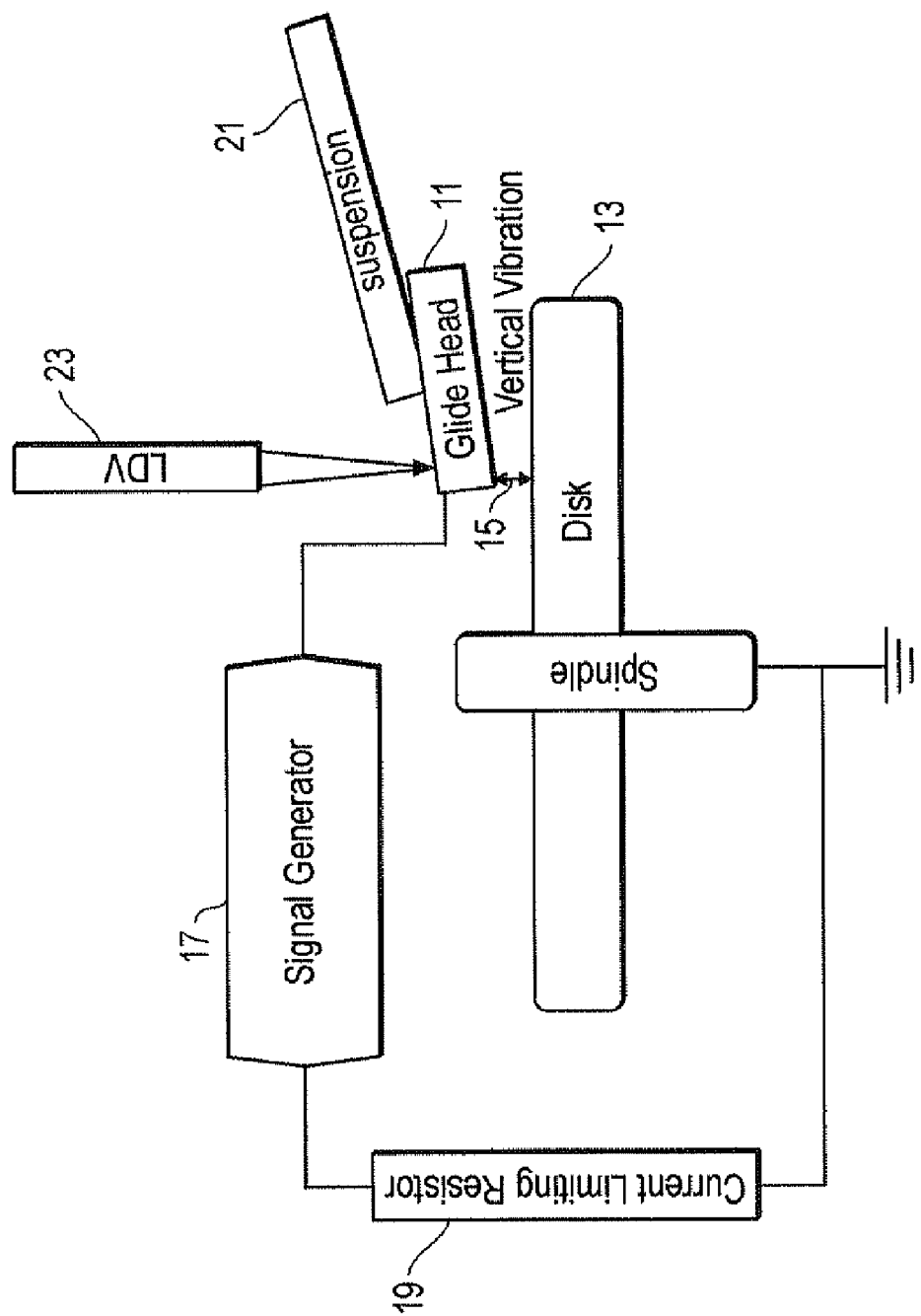
FIG. 1 is a schematic drawing of one embodiment of a system constructed in accordance with the invention.

Referring to FIGS. 1-4, embodiments of a system, method and apparatus for measuring head-disk clearance by slider vibration and calibrating the fly height performance of sliders in disk drives. Fly height may be defined as the absolute distance from a reference point on the slider, usually the lowest point on the slider, to the mean of the disk topography. Head-disk clearance may be defined as the allowable fly height reduction before the slider makes contact with the disk.

In one embodiment (e.g., FIG. 1), the fly height clearance may be measured with a pico glide head 11 relative to a disk 13. The vibration 15 of the head 11 at, for example, the P2 resonance mode is excited by an electrostatic force. Such electrostatic force may be provided by a signal generator 17 and current limiting resistor 19. Other means of excitation can also be used, for example, using PZT crystals mounted on the suspension 21.

Figure 2:
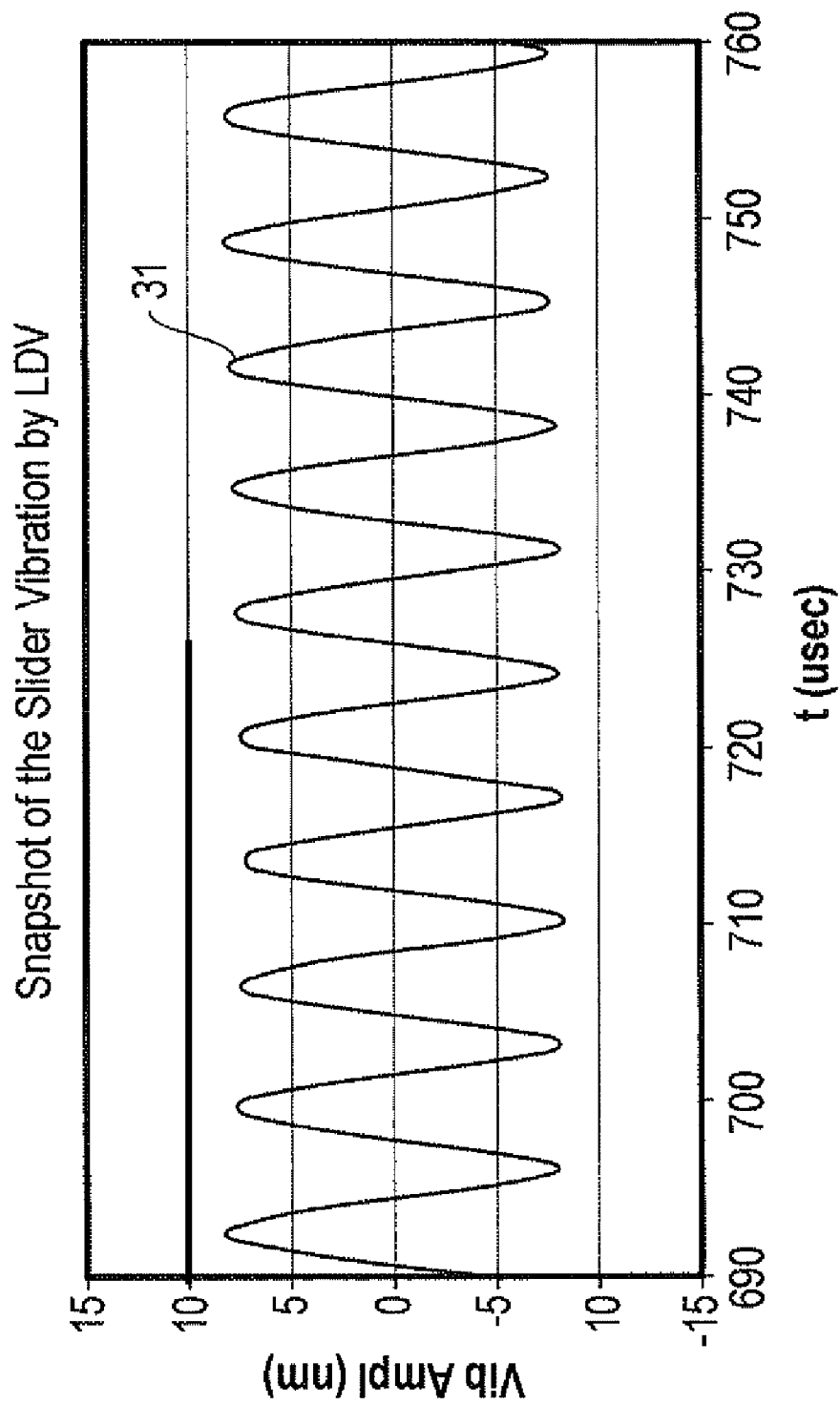
FIG. 2 is a plot of one embodiment of slider vibration measured by a laser doppler velocimeter in accordance with the invention.
Figure 3:
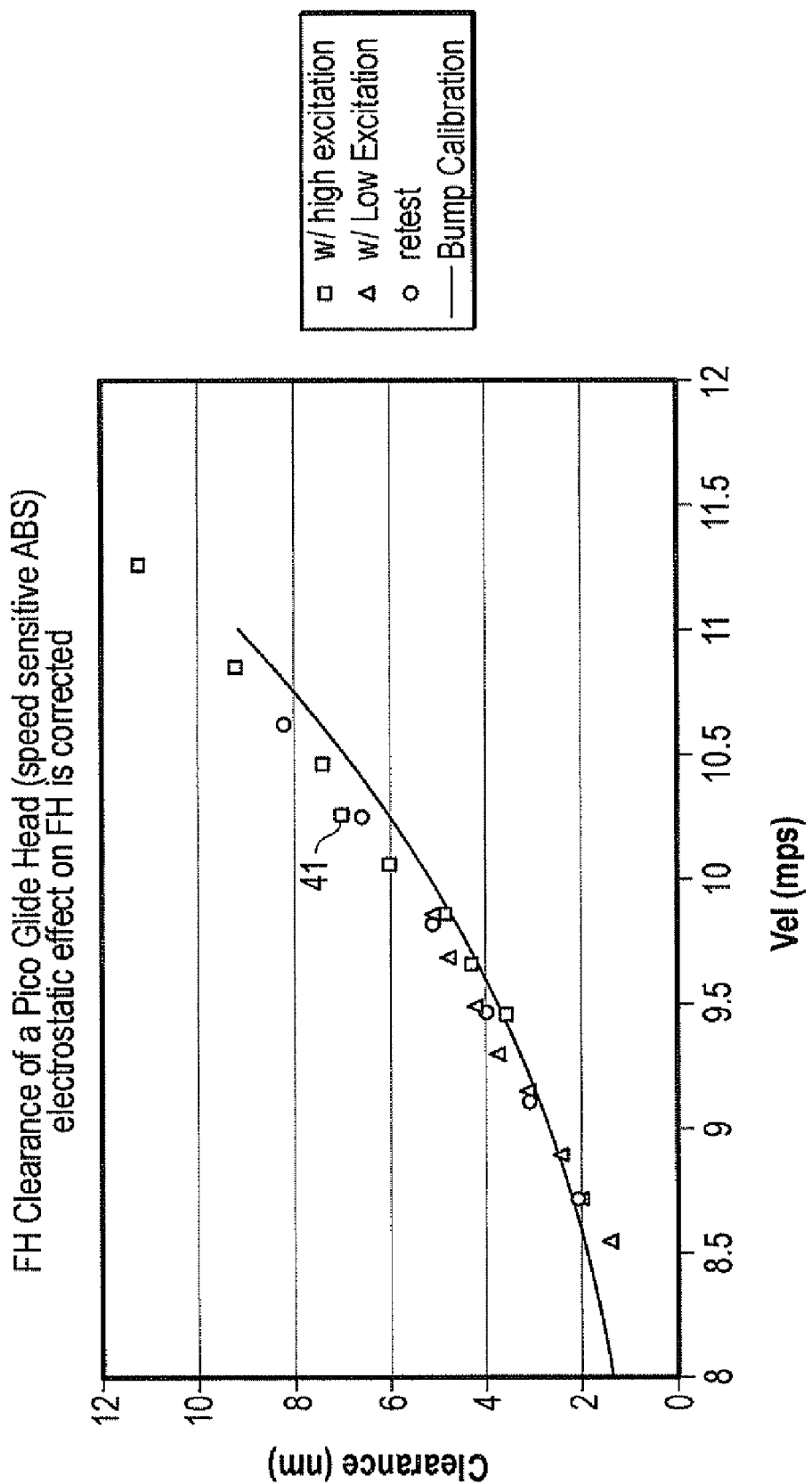
FIG. 3 is a plot of one embodiment of fly height measurements over time in accordance with the invention.

The plot 31 of FIG. 2 shows a snapshot of a slider's P2 vibration measured by, e.g., a laser doppler velocimeter (LDV) 23 (FIG. 1). In addition, some fly height clearance measurements 41 are depicted in FIG. 3. This data demonstrates the viability and repeatability of the invention. The fly height is conventionally calibrated with a "bump" technique and touch down height (TDH) standard disks. For example, the bump height and TDH are 7 nm and 2 mm, respectively, which are based on a conventional calibration method.

In one embodiment, the invention comprises a method of calibrating a fly height of a slider. The method includes the steps of flying a slider above a disk, the slider having a head for reading data from the disk; vibrating the slider such that the slider oscillates relative to the disk without contacting the disk; measuring a true vibration of the fly height of the slider relative to the disk; measuring a magnetic variation of the slider due to the vibration and predicting a fly height vibration with a Wallace Spacing Loss (WSL) equation; comparing the predicted fly height vibration to the true vibration, and repeating these steps at a different fly height; and then calibrating the fly height of the slider based on the comparing steps (e) to achieve a calibration with a wide fly height range.

The method also may comprise controlling the fly height with thermal fly height controls, and plotting the fly heights versus power supplied to the thermal fly height controls. In some embodiments, the fly heights may be varied at increments on the order of 0.1 nm. The prediction of the fly height vibration may be based on a readback signal from the head, and the readback signal is calibrated in the final step.

The readback signal may be derived from the biased magnetic sensor is known to be related to separation between the magnetic sensor and the magnetic recording layer by the WSL equation. The relative value (d−d') in the WSL equation becomes an absolute value for the fly height.

$$Ad/Ad'=\exp[-2\pi(d-d')/\lambda]$$

wherein:

$Ad$=magnetic signal amplitude at magnetic spacing distance d;

$Ad'$=magnetic signal amplitude at magnetic spacing distance d'; and $\lambda$=write frequency The method also may comprise measuring the true vibration with a laser doppler velocimeter (LDV), and vibrating the slider with arm electronics or electrostatic actuation. The method may further comprise vibrating the slider at a P2 resonance mode in a frequency range of about 50 kHz to 300 kHz. The fly height may be calibrated against the readback signal over the frequency range.

In other embodiments, the invention also comprises a method of measuring a clearance between a disk and a slider, including flying a slider above a magnetic media disk, the slider having a head for reading data from the disk; maintaining a fly height of the slider relative to the disk; vibrating the slider such that the slider oscillates relative to the disk so that the slider contacts the disk; detecting contact between the slider and the disk; and detecting a mean-to-peak amplitude of the vibration at contact to determine the disk-slider clearance.

In other embodiments, the detecting step may comprise making a direct measurement with an LDV, and/or the vibrating step may comprise detecting contact with an arm electronics sensor mounted on the slider. The method also may comprise converting a detected magnetic signal, using a Wallace Spacing Loss equation, to a nanometer distance with a fly height correction. The fly height correction may comprise the following steps: flying a slider above a disk, the slider having a head for reading data from the disk; vibrating the slider such that the slider oscillates relative to the disk without contacting the disk; measuring a true vibration of a fly height of the slider relative to the disk; measuring a magnetic variation of the slider due to the vibration and predicting a fly height vibration with a Wallace Spacing Equation; comparing the predicted fly height vibration of the previous step to the true vibration, and repeating these steps at a different fly height; and then calibrating the fly height of the slider based on the comparing steps to achieve a calibration with a wide fly height range.

Still other embodiments may comprise controlling the fly height with thermal fly height controls, and plotting the fly heights versus power supplied to the thermal fly height controls. The fly heights are varied at increments on the order of 0.1 nm, and predicting the fly height vibration may be based on a readback signal from the head, with the readback signal being calibrated in the final step. The true vibration may be measured with an LDV, and the slider may be vibrated with arm electronics or electrostatic actuation. In addition, the slider may be vibrated at the P2 resonance mode in a frequency range of about 50 kHz to 300 kHz, and the fly height calibrated against a readback signal over the frequency range.

Figure 4:
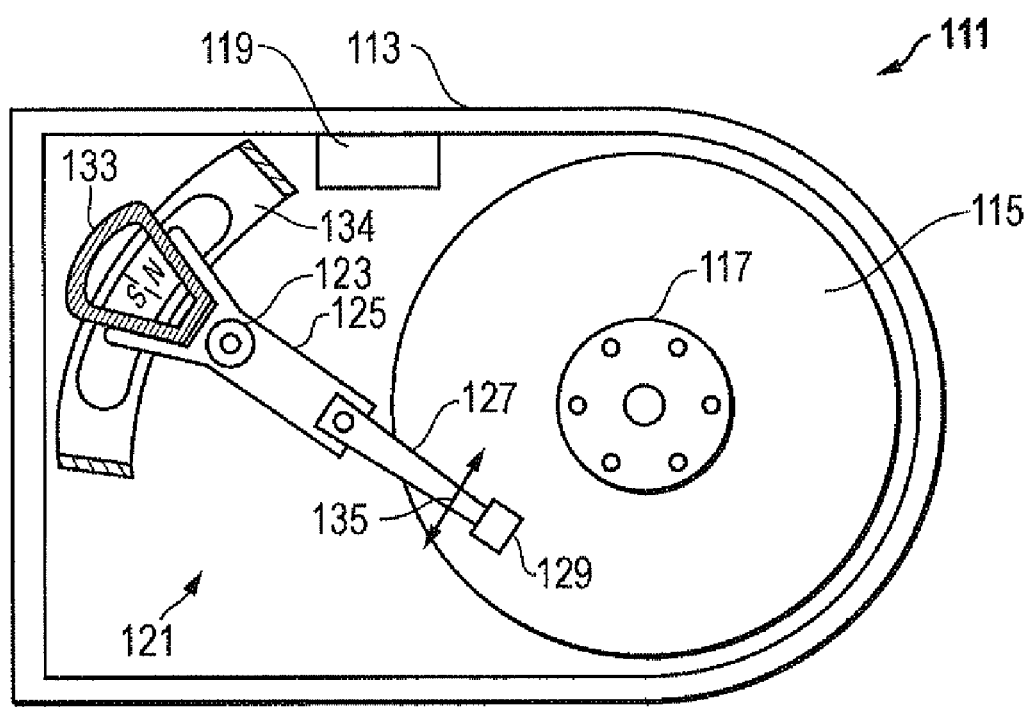
FIG. 4 is a schematic drawing of one embodiment of disk drive constructed in accordance with the invention.

Referring now to FIG. 4, a schematic drawing of one embodiment of an information storage system comprising a magnetic hard disk file or drive 111 for a computer system is shown. Drive 111 has an outer housing or base 113 containing at least one magnetic disk 115. Disk 115 is rotated by a spindle motor assembly having a central drive hub 117. An actuator 121 comprises one or more parallel actuator arms 125 in the form of a comb that is pivotally mounted to base 113 about a pivot assembly 123. A controller 119 is also mounted to base 113 for selectively moving the comb of arms 125 relative to disk 115.

In the embodiment shown, each arm 125 has extending from it at least one cantilevered load beam and suspension 127. A magnetic read/write transducer or head is mounted on a slider 129 and secured to a flexure that is flexibly mounted to each suspension 127. The read/write heads magnetically read data from and/or magnetically write data to disk 115. The level of integration called the head gimbal assembly is the head and the slider 129, which are mounted on suspension 127. The slider 129 is usually bonded to the end of suspension 127. The head is typically formed from ceramic or intermetallic materials and is pre-loaded against the surface of disk 115 by suspension 127.

Suspensions 127 have a spring-like quality which biases or urges the air bearing surface of the slider 129 against the disk 115 to enable the creation of the air bearing film between the slider 129 and disk surface. A voice coil 133 housed within a voice coil motor magnet assembly 134 is also mounted to arms 125 opposite the head gimbal assemblies. Movement of the actuator 121 (indicated by arrow 135) by controller 119 moves the head gimbal assemblies radially across tracks on the disk 115 until the heads settle on their respective target tracks.

While the invention has been shown or described in only some of its forms, it should be apparent to those skilled in the art that it is not so limited, but is susceptible to various changes without departing from the scope of the invention.

What is claimed is:

1. A method of calibrating a fly height of a slider, comprising:
   (a) flying a slider above a disk, the slider having a head for reading data from the disk;
   (b) vibrating the slider such that the slider oscillates relative to the disk without contacting the disk;
   (c) measuring a true vibration of the fly height of the slider relative to the disk;

(d) measuring a magnetic variation of the slider due to the vibration and predicting a fly height vibration with a Wallace Spacing Equation;

(e) comparing the predicted fly height vibration of step (d) to the true vibration of step (c), and repeating steps (a) through (e) at a different fly height; and then (f) calibrating the fly height of the slider based on the comparing steps (e) to achieve a calibration with a wide fly height range.

2. A method according to claim 1, wherein step (a) comprises controlling the fly height with thermal fly height controls.

3. A method according to claim 2, wherein step (f) comprises plotting the fly heights versus power supplied to the thermal fly height controls.

4. A method according to claim 1, wherein the fly heights are varied at increments on the order of 0.1 nm.

5. A method according to claim 1, wherein predicting the fly height vibration in step (d) is based on a readback signal from the head, and the readback signal is calibrated in step (f).

6. A method according to claim 1, wherein step (c) comprises measuring the true vibration with a laser doppler velocimeter (LDV).

7. A method according to claim 1, wherein step (b) comprises vibrating the slider with arm electronics or electrostatic actuation.

8. A method according to claim 1, wherein step (b) comprises vibrating the slider at a P2 resonance mode in a frequency range of about 50 kHz to 300 kHz.

9. A method according to claim 8, wherein the fly height is calibrated against a readback signal over the frequency range.

10. A method of measuring a clearance between a disk and a slider, comprising:

(a) flying a slider above a magnetic media disk, the slider having a head for reading data from the disk;

(b) maintaining a fly height of the slider relative to the disk;

(c) vibrating the slider such that the slider oscillates relative to the disk so that the slider contacts the disk;

(d) detecting contact between the slider and the disk;

(e) detecting a mean-to-peak amplitude of the vibration at contact to determine the disk-slider clearance by converting a detected magnetic signal, using a Wallace Spacing Loss equation, to a nanometer distance with a fly height correction; and the fly height correction comprises:

(1) flying a slider above a disk, the slider having a head for reading data from the disk;

(2) vibrating the slider such that the slider oscillates relative to the disk without contacting the disk;

(3) measuring a true vibration of a fly height of the slider relative to the disk;

(4) measuring a magnetic variation of the slider due to the vibration and predicting a fly height vibration with a Wallace Spacing Equation;

(5) comparing the predicted fly height vibration of step (4) to the true vibration of step (3), and repeating steps (1) through (5) at a different fly height; and then (6) calibrating the fly height of the slider based on the comparing steps (5) to achieve a calibration with a wide fly height range.

11. A method according to claim 10, wherein step (d) comprises detecting contact with an arm electronics sensor mounted on the slider, and step (e) comprises a direct measurement with a laser doppler velocimeter.

12. A method according to claim 10, wherein step (1) comprises controlling the fly height with thermal fly height controls, and wherein step (6) comprises plotting the fly heights versus power supplied to the thermal fly height controls.

13. A method according to claim 10, wherein the fly heights are varied at increments on the order of 0.1 nm, and wherein predicting the fly height vibration in step (4) is based on a readback signal from the head, and the readback signal is calibrated in step (6).

14. A method according to claim 10, wherein step (2) comprises vibrating the slider with arm electronics or electrostatic actuation, and step (3) comprises measuring the true vibration with a laser doppler velocimeter.

15. A method according to claim 10, wherein step (2) comprises vibrating the slider at a P2 resonance mode in a frequency range of about 50 kHz to 300 kHz, and wherein the fly height is calibrated against a readback signal over the frequency range.

* * * * *